United States Patent [19]

Wilson, III

[11] 4,255,708

[45] Mar. 10, 1981

[54] MAGNETORESISTIVE POSITION TRANSDUCER WITH INVARIABLE PEAK SIGNAL

[75] Inventor: Joseph T. Wilson, III, Endicott, N.Y.

[73] Assignee: International Business Machines Corporation, Armonk, N.Y.

[21] Appl. No.: 970,070

[22] Filed: Dec. 15, 1978

[51] Int. Cl.³ .................... G01R 33/12; H01L 43/08
[52] U.S. Cl. ................... 324/208; 324/252; 338/32 R
[58] Field of Search ............ 324/208, 235, 252; 338/32 R, 32 H; 360/113; 365/158

[56] References Cited

U.S. PATENT DOCUMENTS

| | | | |
|---|---|---|---|
| 3,208,269 | 9/1965 | Eccles et al. | 324/208 X |
| 3,846,697 | 11/1974 | Cila et al. | 324/208 X |
| 3,852,661 | 12/1974 | Stabo et al. | 324/208 |
| 3,993,946 | 11/1976 | Makino | 324/208 |
| 4,021,728 | 5/1977 | Makino et al. | 324/235 X |
| 4,039,936 | 8/1977 | Jones et al. | 324/208 |
| 4,079,360 | 3/1978 | Ookubo et al. | 338/32 R X |
| 4,119,911 | 10/1978 | Johnson | 324/208 |
| 4,124,814 | 11/1978 | Laverman | 324/208 |

Primary Examiner—Gerard R. Strecker
Attorney, Agent, or Firm—Kenneth P. Johnson

[57] ABSTRACT

Position identifying transducer using a pair of serially connected magnetoresistive elements with an output terminal at their juncture and which lie in a common plane with the flux-sensitive areas of each element symmetrically disposed about a common center line that is transverse to the direction of motion of the transducer through a variable flux field. This arrangement permits identification of specific locations by providing a peak signal at a predetermined location regardless of the direction of relative motion between the transducer and flux field.

13 Claims, 9 Drawing Figures

MAGNETORESISTIVE POSITION TRANSDUCER WITH INVARIABLE PEAK SIGNAL

BACKGROUND OF THE INVENTION

This invention relates generally to devices for detecting relative motion between two bodies and more particularly to transducers in which magnetoresistive devices are used to sense bidirectional motion.

Magnetoresistive devices whose resistance increases in the presence of magnetic flux are well known and frequently used as displacement sensing devices, contactless switches, variable resistors, or other control elements. For the detection of relative motion, the transducers are usually formed as pairs of serpentine lengths of magnetoresistive material connected across a potential source with a center-tap serving as an output terminal. The two elements lie in a common plane and serially encounter a magnetic flux field that varies in intensity with change in position. The voltage signal at the center-tap provides a fluctuating signal representing the density of flux encountered by each transducer element. This signal is applied to threshold detectors which can be set to respond at various signal levels.

The usual arrangements are particularly well adapted to generate a series of signals representing progression along a toothed or slotted member and are effective in either forward or reverse directions.

In typical displacement sensing configurations, the gap between the magnetoresistors and relatively moving magnetic member will vary thus creating significant changes in the output signal amplitude. The use of elements in pairs with the center-tap increases signal amplitude and compensates for temperature drift. The arrangement also readily lends itself to connection in a bridge sensing circuit. Additionally, the arrangement enables position sensing during standstill and provides signals having fast rise times with which level detectors are more sensitive. Examples of known arrangements are shown in U.S. Pat. Nos. 3,846,697; 4,021,728; 4,039,936; and 4,079,360. Additional description of magnetoresistive devices is found in "Galvanomagnetic Devices" Data Book B1645.101, 1976/77, by Siemens AG, Munich, Germany.

The known arrangements, however, have a deficiency when used to accurately indicate a particular location such as a "home" position. Because of the change in polarity of the signal with change in direction of relative motion, supplemental circuits must be used to select the desired signal. In addition, the prior circuits do not provide a pair of zero cross-overs needed for reliable triggering.

OBJECTS AND SUMMARY OF THE INVENTION

It is accordingly a primary object of the present invention to provide magnetoresistive transducer apparatus having improved response and reliability for the detection of specific locations within a varying magnetic flux field.

A further object of this invention is to provide magnetoresistive transducer apparatus having the ability to produce a distinctive signal whose polarity at a designated position is not altered by a change in direction of relative motion with a moving member.

Yet another object of this invention is to provide magnetoresistive transducer apparatus having a pair of serially connected elements that are arranged in a common plane about a common center line that is transverse to the direction of relative motion between the transducer and variable magnetic flux member.

A still further object of this invention is to provide a magnetoresistive transducer for rotary or linear motion that produces an easily detected output signal.

The foregoing objects are attained in accordance with the invention by providing a pair of serially connected magnetoresistive elements (MRs) lying in a common plane and disposed about a common centerline transverse to the direction of relative motion with respect to the body being sensed. The second element has equal portions on opposite sides of the first element. The size of the first transducer element is such that its effective area lies entirely within either the greatest or the least flux density at the point of displacement being detected. The size of either effective portion of the second element optionally may or may not be such that it lies entirely within a similar sized flux field The output signal is taken at the connection point between the two MRs.

The arrangement of the MR elements in accordance with the invention not only provides a peak signal at the precise location desired but, in addition, produces opposite-going signals immediately adjacent the peak signal to thereby accentuate the rise. This improves detection of the peak signal at crossover, and provides identical signal polarity changes when the position yielding the peak signal is approached from either direction. The MR arrangement can be modified for different embodiments which can influence the magnitude of the resulting output signal. However, the several embodiments readily lend themselves to fabrication and mounting techniques usually employed for such transducers.

The foregoing and other objects, features, and advantages of the invention will be apparent from the following more particular description of the preferred embodiments of the invention, as illustrated in the accompanying drawing.

DETAILED DESCRIPTION OF THE PREFERRED EMBODIMENTS

Figure 1:
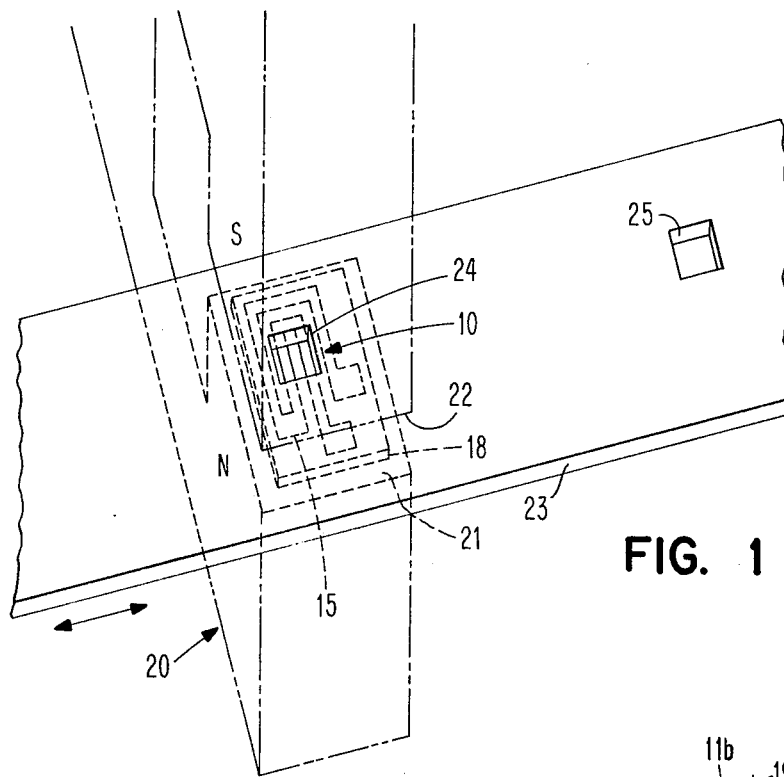
FIG. 1 is a schematic representation of displacement sensing apparatus incorporating a magnetoresistive transducer constructed in accordance with the principles of the invention.
Figure 2:
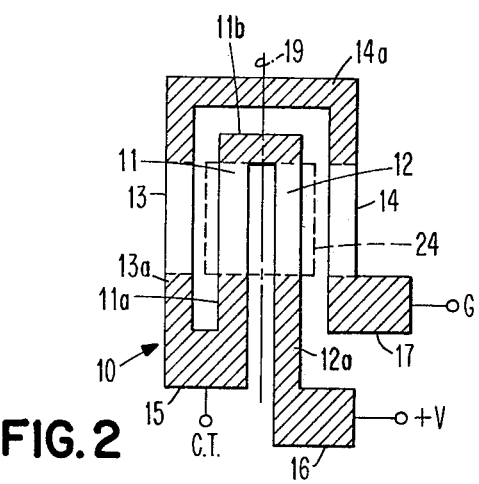
FIG. 2 is a plan view of a magnetoresistive element shown in FIG. 1 and constructed in accordance with the principles of the invention.

Referring to FIGS. 1 and 2, there is shown a magnetoresistive (MR) transducer 10 having a pair of serpentine conductive paths in which one path is comprised of interconnected strips 11 and 12 and a second path is comprised of interconnected strips 13 and 14. The paths are each joined at one end to center-tap 15 and at their other free ends 16 and 17 across a voltage source, not shown. The paths lie in a common plane on a substrate 18 and are symmetrically disposed about a common axis or centerline 19. The serpentine interconnected elements 11–14 are of a magnetic flux-sensitive material such as a combination of indium antimonide and nickel antimonide whose resistance increases with increasing flux density.

The substrate is shown in FIG. 1 attached to one pole face 21 of a C magnet 20. Between the pole face 21 and opposite pole face 22 and supported for relative motion with magnet 20 is a magnetically permeable encoder member 23 having therethrough a pair of cutouts 24 and 25. The cutouts are formed at the particular locations of member 23 which are to be identified during movement of member 23 which may in turn be supported on some reciprocating machine structure.

As shown in more detail in FIG. 2, magnetic flux-sensitive elements 11 and 12 forming one conductive path in the transducer 10 are interconnected by respective elements 11a 11b, and 12a to a center-tap land 15 and voltage terminal 16, while flux-sensitive elements 13 and 14 are interconnected with respective conductors 13a and 14a to form a continuous path from center-tap land 15 to terminal 17. Conductors 11a, 11b, 12a, 13a and 14a and the terminal lands 15, 16, and 17 are usually MR material modified to have a relatively low resistance when compared to the flux-sensitive elements. This is indicated by the cross-hatching and is accomplished often by overplating the flux-sensitive material with a metallic conductor, such as indium, to render that portion of the MR resistance insensitive to magnetic flux. The flux sensitive elements are preferably limited to the area which will be traversed by cutout 24 or 25 in the moving member 23 as indicated by a dotted line representing opening 24. This limitation is used to maximize the transducer output signal variation as the opening moves across the transducer elements.

Figure 3:
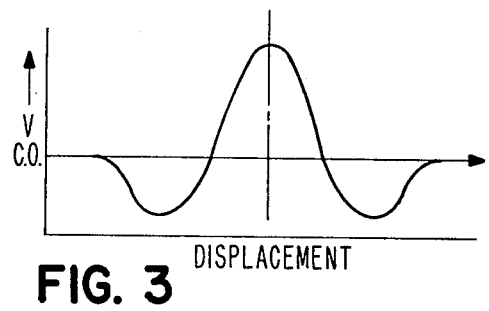
FIG. 3 is a waveform of an output signal at the center-tap of the transducer of FIG. 2.

The output voltage fluctuation at center-tap 15 during motion of member 23 and opening 24 with respect to transducer 10 is shown in FIG. 3. In the position shown in FIGS. 1 and 2, transducer elements 11 and 12 lie entirely within opening 24 so that magnetic flux field is at a minimum for those two elements. Thus, their resistance is lowest. Elements 13 and 14 lie in a relatively dense flux field and have increased resistance. As member 23 moves in either direction from the position shown, either element 11 or 12 will start to move into the region of higher flux density, and correspondingly element 13 or 14 will move into the region of lower flux density at the opening. Thus, the output voltage at center-tap 15 will produce its peak as shown in FIG. 3. The negative swing at the crossover level, designated C.O., provides a faster rise time, so that a level detection device is more readily capable of responding at the desired point. The level of response, of course, can be set where desired to narrow the output pulse duration representing the time at which opening 24 in member 23 is identified as being present.

Figure 4A:
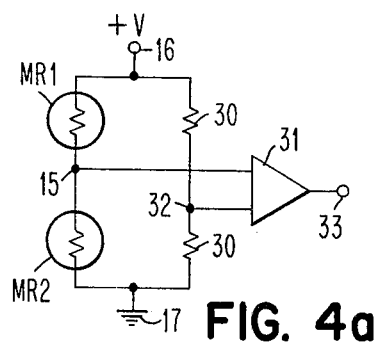
FIGS. 4a and 4b are schematic diagrams of circuit arrangements for the transducer of FIG. 2.
Figure 4B:
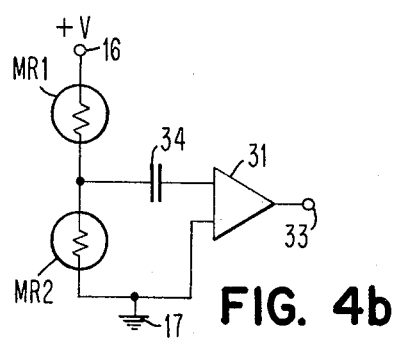

A circuit in which transducer 10 may be incorporated is shown in FIG. 4a. MR1 includes flux-sensitive elements 11 and 12, while MR2 includes flux-sensitive elements 13 and 14. MR1 and MR2 are connected in a bridge circuit with a pair of equal resistors 30 which circuit is connected between potential source at land 16 and ground 17. Center-tap 15 is supplied to one input of a differential amplifier 31, while center-tap 32 between resistors 30 as provides the second input to the differential amplifier. An output is available at terminal 33. This output can be supplied to a level detector which, in turn, can provide a square wave designation of the openings 24 or 25. If static indication of member 23 is unnecessary, the bridge circuit can be eliminated and center-tap 15 respectively coupled to an amplifier through a capacitor 34, as in FIG. 4b.

Figure 5A:
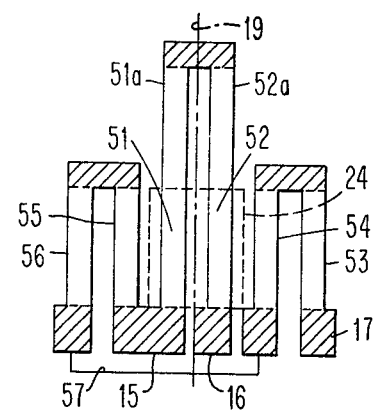
FIGS. 5a, 5b, 6a, and 6b depict alternative embodiments of magnetoresistive transducers incorporating the principles of the invention and illustrate their respective output voltage waveforms.
Figure 5B:
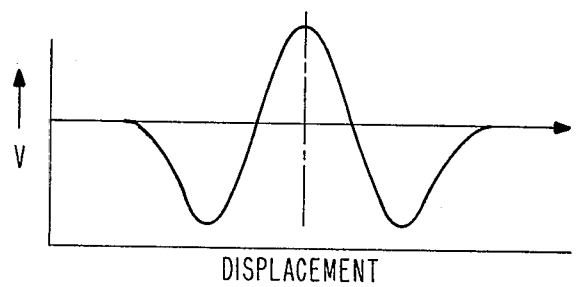

A modification of the transducer described above is shown in FIG. 5a. In this arrangement, magnetically sensitive elements 51 and 52 form a first conductive path between center-tap 15 and one supply terminal 16 while elements 53, 54, 55 and 56 form a second conductive path between supply terminal 17 and center-tap 15. The active links of the flux-sensitive material are the same length in both paths and are interconnected by high conduction, flux-insensitive portions, shown by cross-hatching. It will be noted, however, that the top portions 51a and 52a will remain in a relatively constant flux field since they are never exposed by opening 24 or 25. Paths 53 and 55 are connected by jumper 57. It will be noted that the two paths are symmetrically disposed about axis 19. The output signal at terminal 15 as cutout 24 in a magnetically permeable member 23 moves across the transducer is shown in FIG. 5b. This arrangement provides larger negative swings relative to the peak output signal at the centered position shown.

Figure 6A:
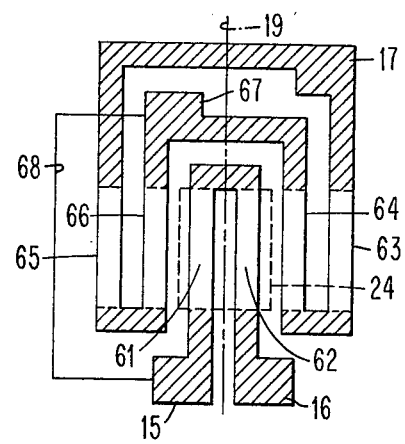
Figure 6B:
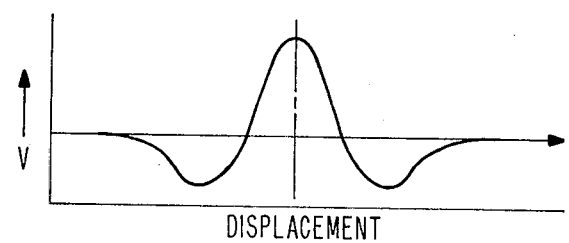

Another embodiment of magnetroresistive transducers is shown in FIG. 6a in which one path is formed of MR elements 61 and 62 in series. The second transducer path is formed of effective elements 63 and 64 in parallel with elements 65 and 66. Of the latter four elements, one of the alternative meanders from terminal 17 includes elements 63 and 64 to terminal 67 which is then connected by a jumper conductor 68 to center-tap 15. The second alternative meander from terminal 17 is through elements 65 and 66 again to terminal 67. The two alternative meanders from terminal 17 provide resistance balance and produce the output signal such as shown in FIG. 6b upon the displacement of window 24 in either direction from the centerline 19. Cross-hatching again indicates flux-sensitive conductors.

While the effective elements have been shown as parallel interconnected strips of magnetic flux-sensitive material, other forms such as zig-zags or different numbers of strips can be connected to provide the resistance-sensitive portions of the transducer. Furthermore, the strip width can be varied to effect desired resistance. In each of the embodiments, the arrangement of MR elements produces an output pulse peak which is always of the same polarity and at the same location regardless of the direction of approach, and the output waveform provides the highly desirable fast rise at that point to improve the accuracy of detection. It will be further noted that a continuous series of equal openings and lands in the magnetically conductive material of the encoder strip can be arranged to produce a continuously varying signal.

Although the magnetic flux source has been shown as a C-magnet, other forms may be used. Also, the transducer may be supported on the opposite side of the permeable member from the magnet if the flux field is adequate. The effective areas of the transducer may be varied to accommodate fringing flux or peculiar field configurations.

While the novel features of the present invention have been shown and described with reference to preferred embodiments thereof, it will be understood by those skilled in the art that the foregoing and other changes can be made in the form and details without departing from the spirit and scope of the invention.

Having thus described my invention, what I claim as new, and desire to secure by Letters Patent is:

1. Magnetic transducer apparatus for detecting motion of a movable member having regions of differing magnetic flux comprising: a substrate; a first plurality of strips of magnetoresistive material interconnected at their ends to form a first continuous path, a second plurality of strips of magnetoresistive material interconnected at their ends to form a second continuous path, said paths lying in a common plane on said substrate, being joined in series with each path lying between and connected to a pair of adjacent terminals and symmetrically disposed about an axis, said axes coinciding and being perpendicular to the direction of motion of said movable member.

2. Apparatus as described in claim 1 wherein said paths have substantially equal magnetic-field-sensitive lengths.

3. Apparatus as described in claim 2 wherein said first and second paths form a pair of resistances in a Wheatstone bridge circuit.

4. Apparatus as described in claim 1 further including an output signal terminal connected to the junction of said two paths and voltage supply terminals connected at the free ends of said paths.

5. Apparatus as described in claim 1 wherein a portion of said first path lies in a field of substantially constant flux.

6. Apparatus as described in claim 1 wherein said second path has substantially twice the flux-sensitive length of said first path.

7. Magnetic transducer apparatus comprising:
a movable member having regions of differing magnetic flux density;
an insulative substrate; and
said paths being joined in series lying a first plurality of strips of magnetoresistive material interconnected at their ends to form a first continuous current path, a second plurality of strips of magnetoresistive material interconnected at their ends to form a second continuous current path.

8. Apparatus as described in claim 7 wherein said first and second current paths are arranged on said substrate so that when said first path lies entirely within one of said regions, said second path lies outside said one region.

9. Apparatus as described in claim 7 wherein each said path includes an equal plurality of parallel strips of said material interconnected at their ends in serpentine configuration.

10. Apparatus as described in claim 7 further including a permanent magnet for supporting said substrate, and varying the magnetic flux in said region.

11. Apparatus according to claim 10 wherein said permanent magnet has a pole face supporting said substrate which is substantially parallel to said direction of motion of said member.

12. Magnetic transducer apparatus comprising:
a movable member having first and second regions of differing flux permeability;
a permanent magnet having a pole face adjacent to said member parallel to the path of motion of said member's
an insulative substrate on said pole face; and a first plurality of strips of magnetoresistive material interconnected at their ends to form a continuous current path, a second plurality of strips of magnetoresistive material interconnected at their ends to form a second continuous current path, said paths being joined in series and lying in a common plane with each path lying between and connected to a pair of adjacent terminals and symmetrically disposed about a centerline, said centerlines coinciding and said first path being capable of lying entirely within said first region when said second path is outside said first region.

13. Apparatus as described in claim 12 wherein said second current path has twice the flux-sensitive length of said first path.

* * * * *

UNITED STATES PATENT AND TRADEMARK OFFICE
CERTIFICATE OF CORRECTION

PATENT NO. : 4,255,708
DATED : March 10, 1981
INVENTOR(S) : Joseph T. Wilson, III It is certified that error appears in the above-identified patent and that said Letters Patent are hereby corrected as shown below:

Claim 7, Column 5, line 34, cancel beginning with "7. Magnetic transducer" to and including "current path." in column 6, line 2, and insert the following claim:

--7. Magnetic transducer apparatus comprising:

a movable member having regions of differing magnetic flux density;

an insulative substrate; and a first plurality of strips of magnetoresistive material interconnected at their ends to form a first continuous current path, a second plurality of strips of magnetoresistive material interconnected at their ends to form a second continuous current path, said paths being joined in series lying in a common plane with each path lying between and connected to a pair of adjacent terminals and symmetrically disposed about an axis, said axes coinciding and being perpendicular to the direction of motion of said movable member.--

UNITED STATES PATENT AND TRADEMARK OFFICE
CERTIFICATE OF CORRECTION

PATENT NO. : 4,255,708

DATED : March 10, 1981

INVENTOR(S) : Joseph T. Wilson, III

It is certified that error appears in the above-identified patent and that said Letters Patent are hereby corrected as shown below:

Claim 12, Column 6, line 24, cancel "member's" and insert --member;--; line 27, after "a" insert --first--.

Signed and Sealed this

Fifteenth Day of September 1981

[SEAL]

Attest:

Attesting Officer

GERALD J. MOSSINGHOFF

Commissioner of Patents and Trademarks